(12) United States Patent
Venkitakrishnan

(10) Patent No.: US 7,003,441 B2
(45) Date of Patent: *Feb. 21, 2006

(54) METHOD FOR DERIVING THE BENCHMARK PROGRAM FOR ESTIMATING THE MAXIMUM POWER CONSUMED IN A MICROPROCESSOR

(75) Inventor: Padmanabha Venkitakrishnan, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 877 days.

This patent is subject to a terminal disclaimer.

(21) Appl. No.: 09/920,382

(22) Filed: Jul. 31, 2001

(65) Prior Publication Data

US 2003/0037270 A1 Feb. 20, 2003

(51) Int. Cl.
G06F 17/50 (2006.01)
(52) U.S. Cl. .............................. 703/13; 716/4
(58) Field of Classification Search .................. 703/13
See application file for complete search history.

(56) References Cited

U.S. PATENT DOCUMENTS 6,513,145 B1 * 1/2003 Venkitakrishnan ............. 716/4

OTHER PUBLICATIONS

Chen, Rita Yu; Irwin, Mary Jane; Raminder, S. Bajwa; "An Architectural Level Power Estimator", 1998, ISCA 1998.*
Fomaciari, W.; Gubian, P.; Sciuto, D.; Silvano, C.; "System-Level Power Evaluation Metrics", 1997, Proceedings, Second Annual IEEE International Conference on Innovative Systems in Silicon 1997.*
Landman, Paul; High-Level Power Estimation, 1996, International Symposium on Low Power Electronics and Design, Proceedings of the 1996 International Symposium on Low Power Electronics and Design.*
Bartleson, Karen "A New Standard for System-Level Design", Sep. 1999, Synopsys.*
Peschko, Ed; DeWolfe, Michele; "Perl 5 Complete", 1998, McGraw-Hill Professional.*
"Computer Dictionary", 1994, Microsoft Press.*
"Wattch: a Framework for Architect-Level•Power Analysis and Optimizations", Brooks et al.,Proceedings of the 27th International Symposium on Computer Architecture, Jun. 2000, Vancouver, BC, pp. 83-94.
Dake Liu and Christer Svensson—"Power Consumption Estimation in CMOS VLSI Chips"—Jun. 1994- pp. 663-670.
Rita Yu Chen, Mary Jane Irwin and Raminder S. Bajwa—"An Architectural Level Power Estimator" Jun. 1998—pp. 1-5.

* cited by examiner

Primary Examiner—Paul L. Rodriguez
Assistant Examiner—Russ Guill
(74) Attorney, Agent, or Firm—Richard P. Lange

(57) ABSTRACT

In one embodiment, for an electronic architecture with a functional constitution performing a number of functions characterized by separate stages performing subfunctions, a method of deriving a benchmark program for estimating the maximum power consumption by modeling a functional model of the architecture, compiling the benchmark program into a corresponding instruction stream, valuating power weights for each stage of each function of each constituent, inserting the power weights, running the model in a maximum power consumption mode, and summarizing power consumption. In one embodiment, the benchmark program is applied by specifying a design analysis to be performed, selecting a function, designating a stages performing that function, removing a set of instruction set architecture instructions corresponding the designated stage, emulating the constituent subfunction corresponding to the stages designated stage, and summarizing. In one embodiment, the model is written in SystemC. In one embodiment, a compiler used is a PERL script.

10 Claims, 11 Drawing Sheets

|  | Alpha 21264 | AMD Athlon | Intel PIII | MIPS R12000 |
|---|---|---|---|---|
| Clock rate | 700 MHz | 1000 MHz | 1000 MHz | 300 MHz |
| Cache (I/D) | 64K/64K | 64K/64K | 16/16/256 | 32K/32K |
| Issue rate | 4 issue | 3 x 86 instr | 3 x 86 instr | 4 issue |
| Pipe stages ‡ | 7/9 stages | 9/11 stages | 12/14 | 6 stages |
| Out of order | 80 instr | 72 ROPs | 40 ROPs | 48 instr |
| Rename regs | 48/41 | 36/36 | 40 total | 32/32 |
| BHT entries | 4K x 9-bit | 4K x 2-bit | ≥512 | 2K x 2-bit |
| TLB entries | 128/128 | 280/288 | 32 I/64 D | 64 unified |
| Memory B/W | 2.66 GB/s | 1.6 GB/s | 1.06 GB/s | 539 MB/s |
| Package | CPGA-588 | CBGA-576 | PGA-370 | CPGA-527 |
| IC process | 0.25µ 6M | 0.18µ 6M | 0.18µ 6M | 0.25µ 4M |
| Die size | 205 mm² | 102 mm² | 106 mm² | 204 mm² |
| Transistors | 15.2 million | 22 million | 24 million | 7.2 million |
| Est mfg cost* | $160 | $70§ | $40 | $140 |
| Power (max) | 75 W | 60 W* | 23 W* | 20 W |
| SPEC95b† | 35/55 | 42/30 | 47/32 | 18/30 |
| Availability | 3Q99 | 1Q00 | 1Q00 | 2Q99 |
| 1K list price | $2,296§§ | $1299§ | $990 | Not public |

†SPEC95 baseline (int/FP)  ‡integer ALU/load  §indudes 512K L2 cache

CONVENTIONAL ART

Fig. 1

| HP<br>PA-8600 | IBM<br>Power3 | PowerPC<br>7400 (G4) | Sun<br>Ultra-2 | Sun<br>Ultra-21 | Hal<br>Sparc64-III |
|---|---|---|---|---|---|
| 552 MHz | 400 MHz | 450 MHz | 450 MHz | 360 MHz | 296 MHz |
| 512K/1M | 32K/64K | 32K/32K | 16K/16K | 16K/16K | 64K/64K |
| 4 issue | 4 issue | 3 issue | 4 issue | 4 issue | 4 issue |
| 7/9 stages | 7/8 stages | 4/5 stages | 6/9 stages | 6/9 stages | 8/10 |
| 56 instr | 32 instr | 5 instr | None | None | 63 instr |
| 56 total | 16 int/24 fp | 6 int/6 fp | None | None | 34/32 |
| 2K x 2-bit | 2K x 2-bit | 512 x 2-bit | 512 x 2-bit | 512 x 2-bit | 8K x 2-bit |
| 120 unified | 128/128 | 128/128 | 64I/64D | 64I/64 D | 32/32/256 |
| 1.54 GB/s | 1.6 GB/s | 1.6 GB/s | 1.9 GB/s | 600 MB/s | 1.33 GB/s |
| LGA-544 | SCC-1,088 | CBGA-360 | CLGA-787 | PBGA-587 | CLGA-957 |
| 0.25µ 4M | 0.22µ 6M | 0.22µ 6M | 0.29µ 4M | 0.29µ 4M | 0.25µ 5M |
| 477 mm$^2$ | 163 mm$^2$ | 83 mm$^2$ | 126 mm$^2$ | 150 mm$^2$ | 240 mm$^2$ |
| 130 million | 23 million | 10.5 million | 3.8 million | 4.1 million | 17.6 million |
| $330 | $110 | $45 | $70 | $85 | $250 |
| 60 W* | 36 W | 13 W | 20 W | 38 W | 50 W |
| 39/61 | 24/46 | 21/20 | 16/24 | 12/17 | 15/28 |
| 1Q00 | 1Q00 | 3Q99 | 4Q98 | 4Q98 | 4Q98 |
| Not public | Not public | $345 | $4,249§§ | $470 | Not public |

§§includes 2M L2 cache  (Source: vendors, except *MDR estimates)

CONVENTIONAL ART

Fig. 1 Continued

METHOD FOR DERIVING THE BENCHMARK PROGRAM FOR ESTIMATING THE MAXIMUM POWER CONSUMED IN A MICROPROCESSOR

BACKGROUND OF THE INVENTION

1. Field of the Invention

The present invention relates to the field of microprocessor design. Specifically, the present invention relates to a method for analyzing the power expenditure of microprocessor designs at the architectural level, including accurate estimation of maximum power consumption.

2. Related Art

Performance requirements have pushed microprocessor complexity to millions of devices per chip, and clock rates into the GHz range. Consequent microprocessor power consumption is outpacing gains from advances and scaling in silicon technologies, and benefits of reduced power supply voltages. Thus, power consumption is a major issue in microprocessor design, and reducing power consumption without adversely affecting performance is a major challenge. Conventional Art FIG. 1 illustrates this situation for contemporary personal computer and workstation processor architectures.

The power consumption issue affects almost every aspect of the initial architecture, ultimate performance, and overall utility of processors. From a system design perspective, processor maximum power consumption is much more useful than average power consumption. Beside criteria specific to the processor itself, this is also related to infrastructure specifications, cooling for example, which are designed primarily to accommodate the maximum processor power dissipation.

Maximum power consumption of microprocessors is either measured experimentally from real chips, or calculated when the processor design is approaching completion. Conventionally, these determinations are based on switching activities in the processor. A typical analytical method of the conventional art may apply a special set of instruction streams, for example, a "power virus," to run a processor in maximum power consumption mode.

One such computation, based on the switched capacitance of every node in the processor, can be expressed by $$P = CV^2 fA$$

where A is the activity of all nodes in the processor when running a maximum power virus code, C is the node FET capacitance adjusted to compensate for average static current and correlated with artwork based SPICE results including wire capacitance, V is the supply voltage, and f is the processor frequency. There are also, in the conventional art, commercially available implementation level power estimation tools such as the Sente WattWatcher™, of Sente, Inc. of Acton, Mass. These are full chip power analysis tools for the system-on-chip designs, usable at both the register-transfer and gate levels.

Conventionally, architectural level power estimation for processors is empirically based on implementation level measurements; the power consumption of existing functional unit implementations is measured and models are produced based on those measurements. Such conventional approaches include fixed activity macromodeling, activity-sensitive macromodeling, and transition-sensitive macromodeling. Another approach imitates the behavior of the processor with previously characterized energy consumption of its functional units. All of the foregoing conventional methods are implementation-constrained; they all need some form of past implementation data at the functional unit level to estimate processor power dissipation. Hence they limit the freedom to experiment with architectural tradeoffs to evaluate various power management techniques.

While these assessments are available at the implementation level, processor architecture has by then already been defined; they are ineffective in initial design. To effectively design power efficient processors, knowledge of their power consumption behavior early in the architectural definition stage is essential. Few such methods are available for analyzing power consumption at this architectural level. But comprehension of the processor's power consumption behavior early in the architectural definition stage of processor design is essential to minimizing power consumption without concomitantly curtailing its subsequent (e.g., post-implementation) performance.

For example, power efficiency for each of the example processor architectures in Conventional Art FIG. 1 can be calculated based on the Horowitz equation, well known in the art, $$\text{Power Efficiency} = 1/(\text{Energy})(\text{Delay}) = \text{SPEC}^2/\text{Watt}$$

where SPEC is the appropriate Standard Performance Evaluation Corporation benchmark rating for each listed processor (SPEC, Warrenton, Va.). Conventional Art FIG. 2 summarizes the maximum power efficiencies of these processor architectures, relative to each other, for both SPECint and SPECfp performance (e.g., SPEC integer and floating point performance ratings, respectively), although the SPEC benchmarks, by themselves, may not represent maximum power dissipation for these processors.

Knowing such power performance behavior for microprocessors during their architectural definition stages, prior to commitment to implementation, would be invaluable for making appropriate architectural feature choices for intended application spaces. For example, floating point power efficiency information is useful in tuning the architecture for either PC or workstation applications. In fact, from Conventional Art FIG. 2, the processors intended primarily for the PC applications (AMD Athlon™, Intel PIII™, and PowerPC 7400™) do show lower power efficiency for SPECfp than for SPECint, whereas the rest of the processors, primarily intended for workstation type applications, show higher power efficiencies for SPECfp than for SPECint.

Architectural solutions or enhancements for power-aware behavior of processors proposed in the conventional art include complexity adaptive processors, instruction scheduling for low power, dynamically reconfigurable functional units, optimizations to the cache hierarchy, and techniques to reduce bus energy. Many of these proposed solutions will require architectural level power estimation to evaluate their relative benefits from a power perspective.

It is conceivable that a power consumption estimation scheme may be developed for each individual processor to be designed, analyzing maximum power criteria prior to implementation. Developing such a scheme may be incorporated into the initial architectural process of each new processor, or at best, related group of similar processors. However, this would probably be expensive, repetitive, and wasteful.

The conventional art is problematic because the field as currently practiced applies only at the post-architectural stage implementation level, generally considers only average power, and applies only to specific designs.

What is needed is a new method for deriving a benchmark program for estimating the maximum power consumption in a microprocessor. What is also needed is a method for deriving a benchmark program for estimating the power consumption in microprocessors, which is applied in initial architectural stages, during the design of microprocessors, before expenditure of resources is committed to the implementation of real devices. Further, what is needed is a method deriving a benchmark program for estimating the power consumption in a microprocessor which applies analysis based on maximum power dissipation by the processor. Further still, what is needed is a method achieving the foregoing accomplishments which is applicable to any microprocessor architecture under design, permitting analysis of the design.

SUMMARY OF THE INVENTION

The present invention provides a novel method for deriving a benchmark program for estimating the maximum power consumption in a microprocessor, other integrated circuit, or system. The present invention also provides a method deriving a benchmark program for estimating the power consumption in microprocessors, which is applied in initial architectural stages, during the design of microprocessors, before expenditure of resources is committed to the implementation of real devices. Further, the present invention provides a method deriving a benchmark program for estimating the power consumption in a microprocessor, which applies analysis based on maximum power dissipation by the processor. Further still, the present invention provides a method achieving the foregoing accomplishments, applicable to any microprocessor architecture under design, and permitting analysis of the design.

In one embodiment, the present invention, provides a novel method for deriving a benchmark program for estimating the maximum power consumption in a microprocessor. In one embodiment, the method is applicable not only to microprocessors, but to any other integrated circuit or to entire systems, including, but not limited to computer systems. In one embodiment, maximum power dissipation estimates are assessed at an pre-implementation architectural level applicable to any architecture.

In one embodiment of the present invention, a method deriving a benchmark program for estimating the maximum power consumption in microprocessors is applied in architectural stages, during the design of microprocessors, before expenditure of resources is committed to the implementation of real devices. Power estimation for a processor at the architectural level is a complex problem. At this stage of processor design, conceptual ideas are being evaluated, and implementation details are not yet available. Power consumption, on the other hand, is very much dependent on implementation. An innovative method of architectural modeling in the present embodiment enables power estimation to be within reasonable margins of errors.

In one embodiment, the present invention provides a method for deriving a benchmark program for estimating the maximum power consumption in a microprocessor, which applies analysis based on maximum power dissipation by the processor. In the present embodiment, a high level model of the processor receives power weights based on actual technology parameters added to every step of every use of processor functions, a benchmark program runs the processor in its maximum power consumption mode, an instruction stream to exercise the model is produced, and total power consumption and that of each architectural function is summarized.

In one embodiment, the present invention provides a method achieving the foregoing accomplishments, applicable to any microprocessor architecture, other integrated circuit architecture, or system, including computer systems, under design. In the present embodiment, maximum power efficiency of PC, workstation, and other processors, other integrated circuits (IC), including application specific ICs, and systems is separated from the architectural component and the technology component of processor power estimation and analysis. This approach provides complete freedom to perform power-aware architectural experiments using behavioral level simulations for any processor, without interference or slow-down due to the implementation technology parameters, permitting significant analysis of any design.

These and other objects and advantages of the present invention will become obvious to those of ordinary skill in the at after reading the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Conventional Art FIG. 1 is a table summarizing relative maximum power efficiencies, along with other attributes of various existing microprocessor architectures.

Conventional Art

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, magnetic, optical, and/or electro-optical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "estimating" or "simulating" or "modeling" or "designating" or "compiling" or "inserting" or "running" or "deriving" or "performing" or "summarizing" or "emulating" or "determining" or "counting" or "selecting" or "calculating" or "multiplying" or "summarizing" or "analyzing" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

Figure 2:
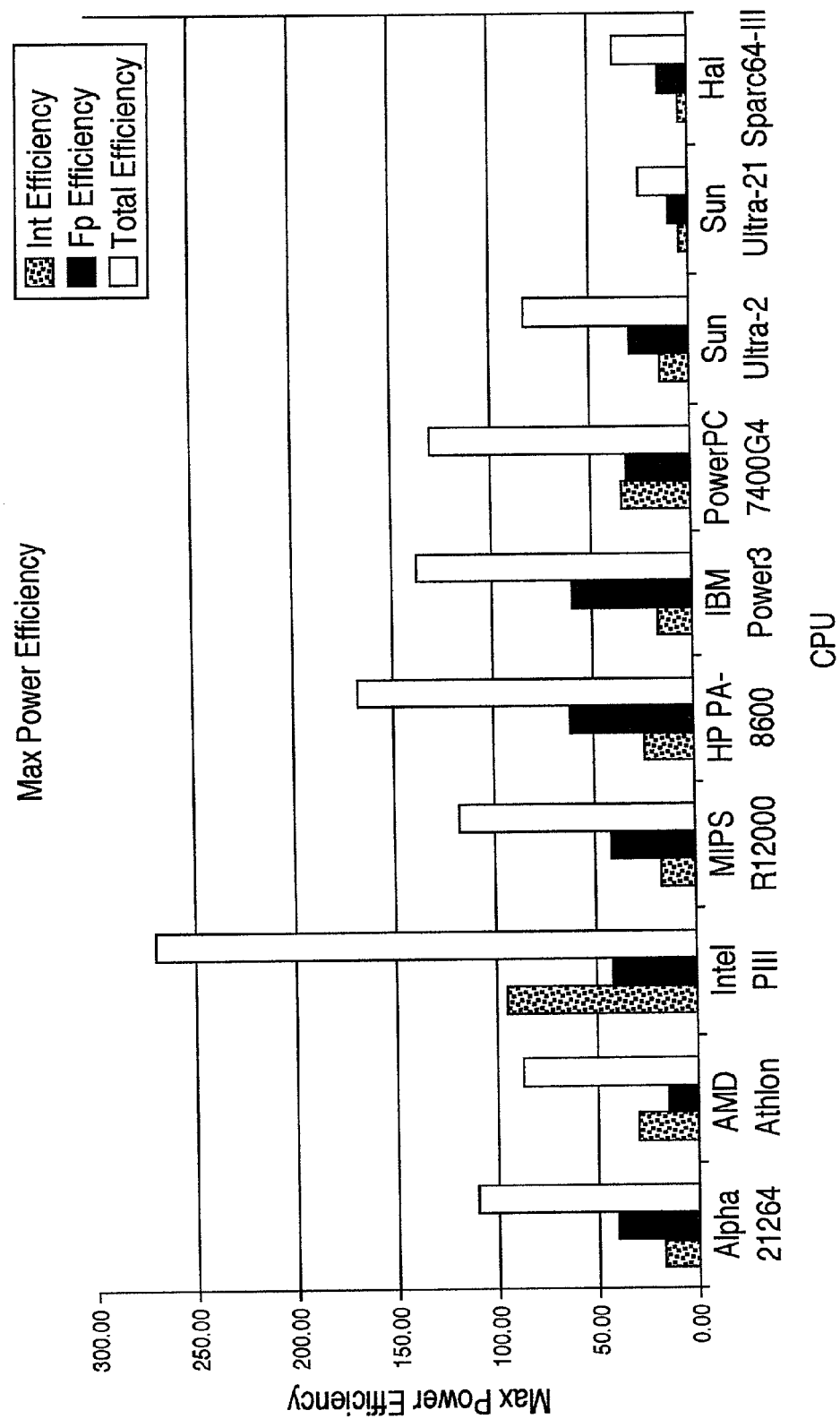
FIG. 2 is a bar graph of relative maximum power efficiencies of various existing microprocessor architectures.
Figure 3A:
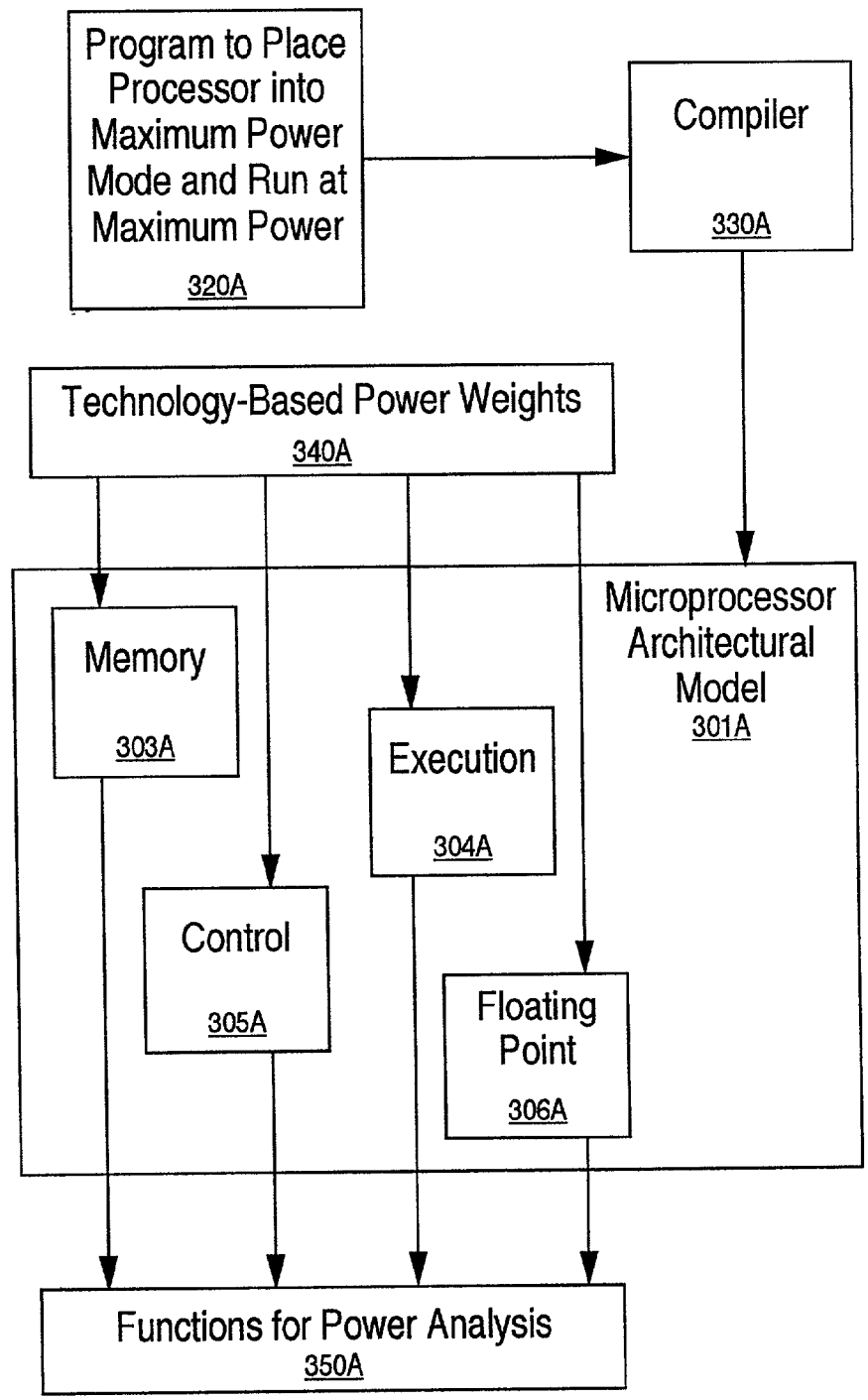
FIG. 3A is a block diagram depicting the relationships between architectural functions for power analysis, in accordance with one embodiment of the present invention.

Certain portions of the detailed descriptions of the invention, which follow, are presented in terms of programs, compilers, values, and architectural functions (e.g., power program 320A, compiler 330A, power weights 340A, functions 350A, respectively; FIG. 3A), and as processes (e.g., processes 300B, 400B, and 500C; FIGS, 3B, 4C, and 5C, respectively). These programs and compilers, values and functions, and processes are, in one embodiment, carried out by processors and electrical components under the control of computer readable and computer executable instructions. The computer readable and computer executable instructions reside, for example, in data storage features of computers executing these programs, compilers, and processes, utilizing these values, and making application to these functions. However, the computer readable and computer executable instructions may reside in any type of computer readable medium. Although specific steps are disclosed in figures herein describing the operations of processes (e.g., FIGS. 3B, 4C, and 5C; describing processes 300B, 400B, and 500C, respectively), such steps are exemplary. That is, the present invention is well suited to performing various other steps or variations of the steps recited in the flowcharts of the figures herein. Further, it is appreciated that the steps of these processes may be performed by software or hardware or any combination of software and hardware.

The present invention is discussed primarily in the context of a method for estimating the maximum power consumption in a microprocessor, other integrated circuit, or system. The present invention also provides a method for estimating the power consumption in microprocessors, which is applied in initial architectural stages, during the design of microprocessors, before expenditure of resources is committed to the implementation of real devices. Further, the present invention provides a method for estimating the power consumption in a microprocessor, which applies analysis based on maximum power dissipation by the processor. Further still, the present invention provides a method achieving the foregoing accomplishments, applicable to any microprocessor architecture under design.

EXEMPLARY MODELING AND TOOL ENVIRONMENT

Exemplary Architectural Modeling Overview

Figure 3B:
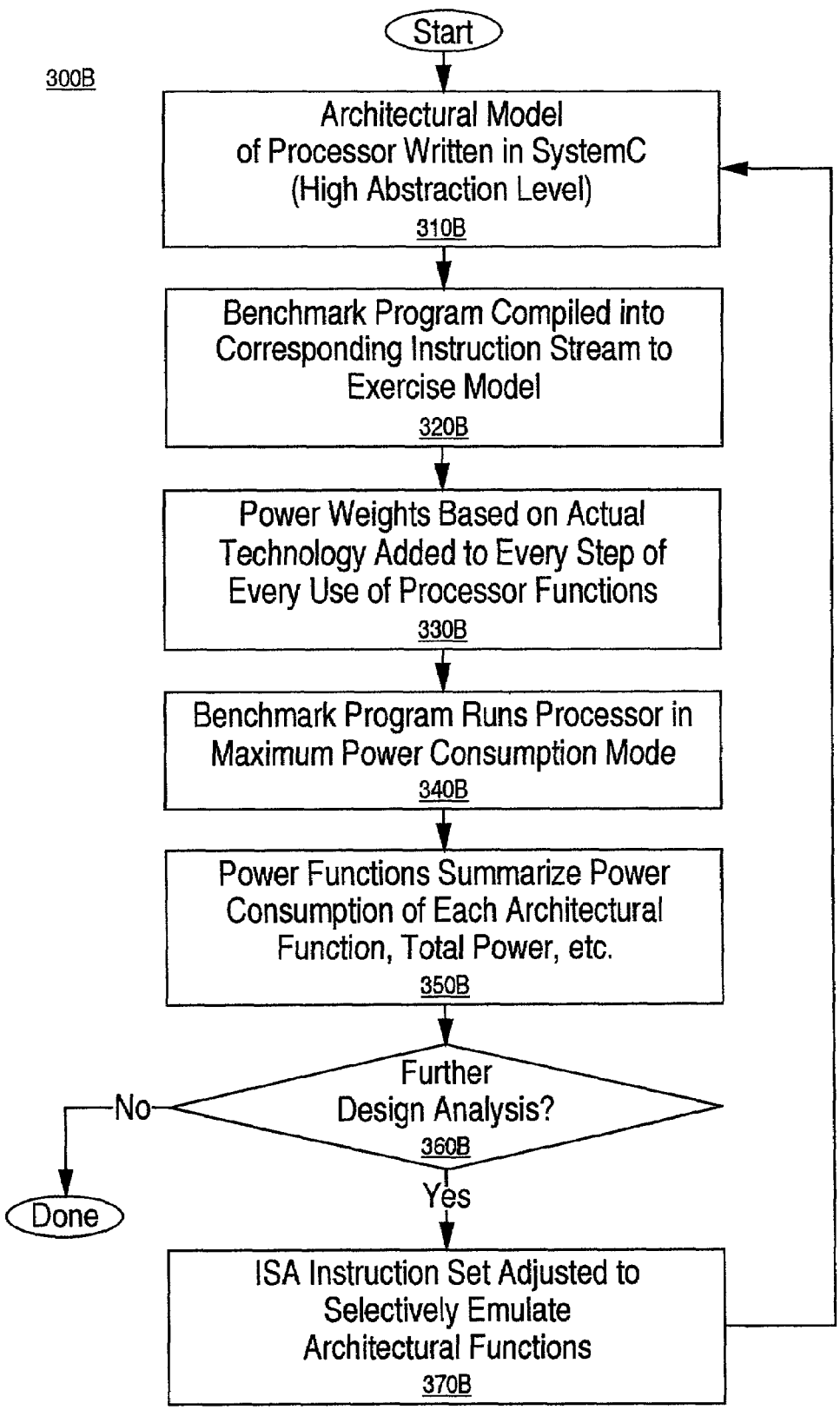
FIG. 3B is a flow chart of the steps in a process for employing power weights to summarize power consumption of architectural functions, in accordance with one embodiment of the present invention.

FIG. 3A is a block diagram depicting the functional relationship model 300A between architectural functions for power analysis, in accordance with one embodiment of the present invention. FIG. 3B is a flow chart of the steps in a process for employing power weights to summarize power consumption of architectural functions, in accordance with one embodiment of the present invention. In the following discussion, FIGS. 3A and 3B will be considered together, for brevity and clarity.

Figure 4A:
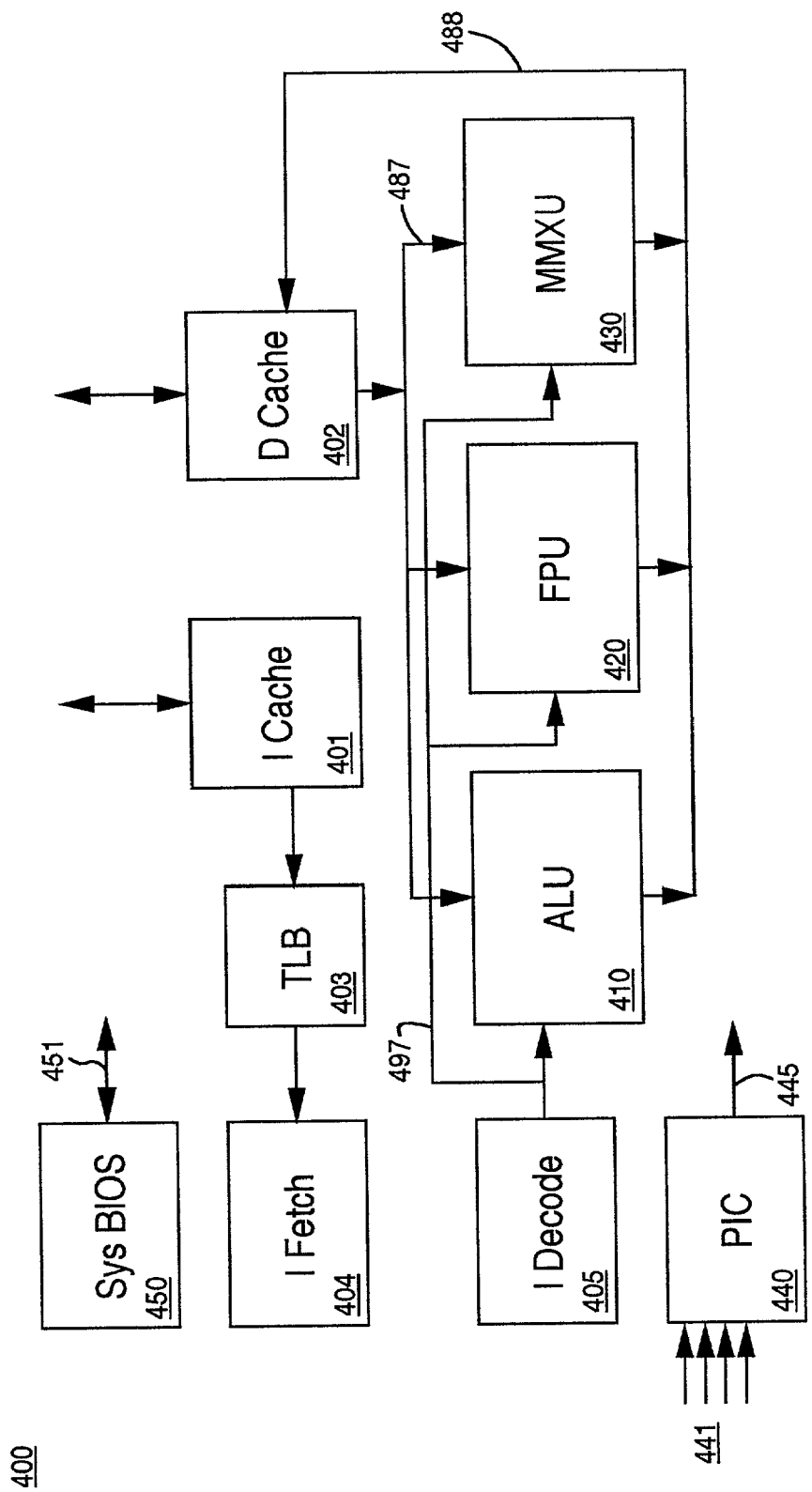
FIG. 4A is a functional diagram of a simple exemplary RISC processor architecture, for application of one embodiment of the present invention.

In the present embodiment, an exemplary architectural level model 301A (FIG. 3A) of a processor (e.g., processor 400; FIG. 4A) is written in SystemC (C/C++), at a high level of abstraction; step 310B (FIG. 3B).

Microprocessor model 301A has component functionalities, including, in the present example, memory function 303A, execution function 304A, control function 305A, and floating point function 306A (FIG. 3A). In one embodiment, processor (e.g., caches 401 and 402, ALU and FPU 410 and 420, etc., processor 400, respectively; FIG. 4A).

A compiler 330A (FIG. 3A) produces a corresponding instruction stream to exercise model 300A; step 320B (FIG. 3B). In one embodiment, compiler 330A is a Perl script. In one embodiment, compiler 330A may be another extraction and report language. In another embodiment, compiler 330A may be another string assembly and handling utility.

In step 330B (FIG. 3B), power-weights 340A (FIG. 3A), based on actual technology parameters, are added in one embodiment to every step of every use of processor functions 303A, 304A, 305A, and 306A (FIG. 3A). Power weights are crucial in the present embodiment to reducing functional power estimations to the level of individual component technologies within the processor.

In step 340B (FIG. 3B), a benchmark program 320A (FIG. 3A) runs the processor in its maximum power consumption mode. Benchmark program 320A may be a power virus type program.

Functions for power analysis 350A (FIG. 3A) may include in the present embodiment, but not limited to, execution 304A, memory 303A, floating point 306A, and control 305A (FIG. 3A). In step 350B (FIG. 3B), functions 350A are subject to power analysis in the present embodiment, summarizing the power consumption of each architectural function, total processor power consumption etc.

Advantageously, power analysis of each of functions 340A effectuates power-aware architectural tradeoffs. In step 360B (FIG. 3B), a decision is made whether to perform such further design analysis. If a decision is made not to continue the design analysis further, process 300B (FIG. 3B) is complete.

If a decision is made to perform further design analysis, as effectuated, the instruction set architecture (ISA) instruction set is adjusted accordingly. This allows selective emulation of architectural functions in step 370B (FIG. 3B). Process 300B then loops back to step 310B (FIG. 3B) and repeats, with the corresponding ISA instruction set adjustments.

Importantly, the present embodiment separates the architectural component and the technology component of processor power estimation and analysis. The present embodiment furnishes the further advantage of providing complete freedom to perform power-aware architectural experiments using behavioral level simulations, without interference or slow-down due to the implementation technology parameters.

Conventionally, C/C++ is the usual language for architectural modeling of processors and other integrated circuits. However, the C/C++ language lacks semantics to adequately describe hardware modeling concepts such as concurrency, reactive behavior, and timing. Thus, conventionally, processor architectural models are written in such a manner that no clear-cut boundaries can be drawn for any of its hardware functional units. To model these hardware attributes, correspondingly crafting architectural model 301A in the present embodiment, C++ can be extended through classes, without adding new syntactic constructs. One such enabling modeling platform is SystemC.

SystemC is a modeling platform consisting of a set of C++ class libraries, plus a simulation kernel that supports modeling concepts at the architectural level and register transfer level. SystemC also provides a software environment for hardware/software co-design. SystemC is open, free, and enables the use of a wide range of EDA tools that are being developed around it. The Open SystemC Initiative (OSCI) is a collaborative effort among a broad range of companies to support and advance SystemC as a standard for system level design.

Modeling architectural model 301A with SystemC provides the ability to treat each functional unit within a processor (e.g., 401, FIG. 4A) as an object. Thus, advantageously, the architectural model 301A for the processor can be written to closely resemble the hardware. Importantly, this correspondingly provides the flexibility not only to analyze each hardware functional unit independently, but also to characterize interactions between the individual functional units, which may be significant in the power based architectural analysis.

Modeling Application to an Exemplary Processor

With reference to FIG. 4A, a simple reduced instruction set computer (RISC) processor architecture 400 written and simulated in SystemC environment exemplifies one embodiment of the present invention. While the present architecture is exemplary and, for the purposes of explanation herein, simple (e.g., so as to not unnecessarily obscure aspects of the present invention), it is appreciated that the present embodiment may be used to analyze any complex processor, other integrated circuit, and/or system architectures.

FIG. 4A illustrates the functional details of 32-bit RISC processor architecture 400 of the present embodiment. Processor architecture 400 has an arithmetic logic unit (ALU) 410 exercising an integer execution function and a branch execution function, a floating-point function (FPU) 420, a multimedia execution function (MMXU) 430, instruction cache 401 and data cache 402 functions, a translation lookaside buffer (TLB) 403 executing a paging function, and instruction fetch 404 and instruction decode 405 functions. Instruction bus 499 and data busses 487 and 488 interconnect the foregoing component units of processor 400 as appropriate.

Processor architecture 400 also has a programmable interrupt controller (PIC) 440 and a system BIOS 450 function. PIC 450 receives interrupt requests via interrupt request lines 441, and transmits interrupt signals via an interrupt bus 445. BIOS 450 receives and transmits inputs and outputs via an I/O bus 451. It is appreciated that other functions (e.g., IO and clock functions) may be executed by processor 400. However, for clarity and simplicity in the present example, such functions of RISC processor architecture 400 are peripheral, and are not herein considered.

The memory functions of processor architecture 400, may reside primarily, but not exclusively, in instruction and data caches 401 and 402, respectively. These functions may be considered to be performed by a memory functionality.

Figure 4B:
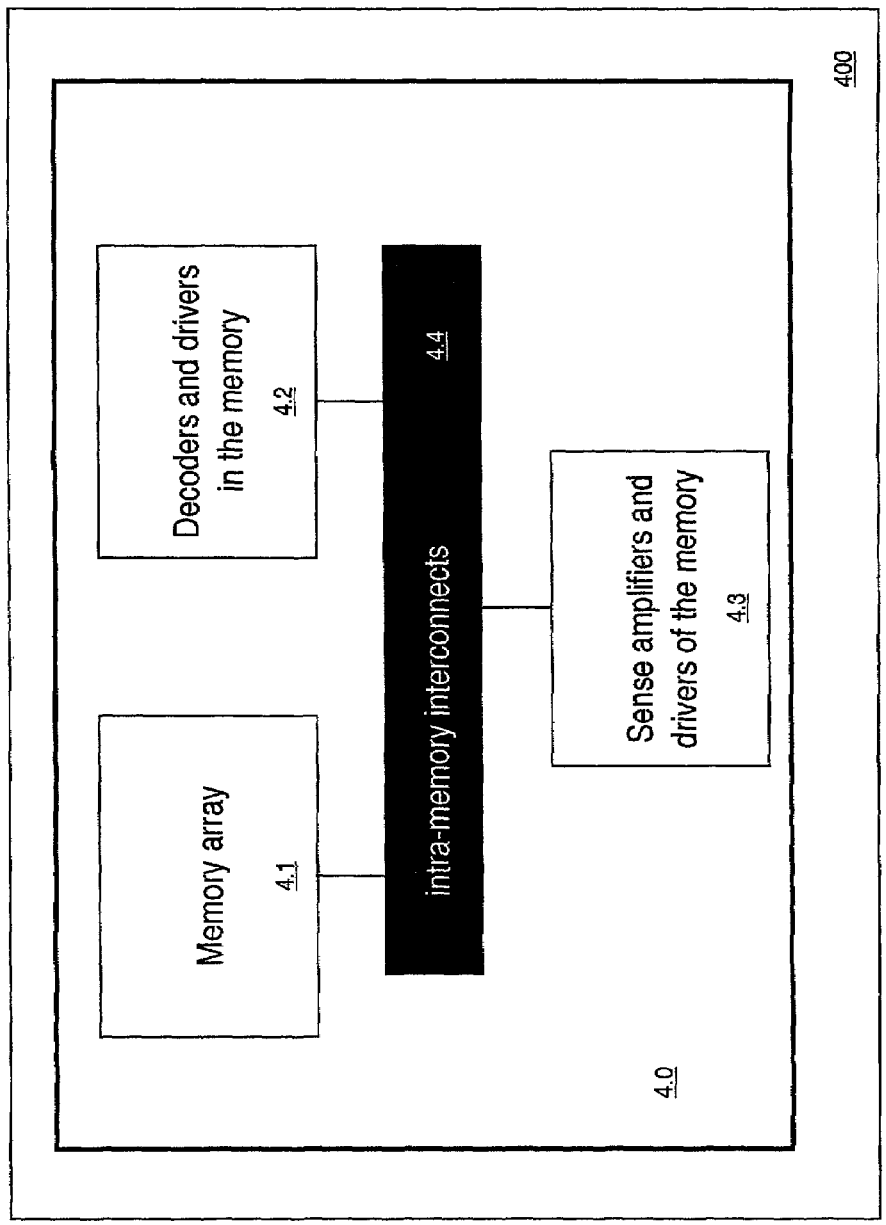
FIG. 4B is a block diagram of a processor architectural memory functions, for application of one embodiment of the present invention.

With reference to FIG. 4B, a memory functionality 4.0 of processor 400 may be considered to be a composite of functional sections, including memory array 4.1, decoders and drivers in the memory 4.2, sense amplifiers and drivers of the memory 4.3, and intra-memory interconnects 4.4.

In the present embodiment, the instruction set architecture (ISA) of RISC processor 400 contains 42 instructions. These include, among others, ALU, FPU, MMX, memory, and branch operations.

In one embodiment, based on the parameters of the technology chosen to implement RISC processor architecture 400, power weights are calculated and added to each step of each use of each architectural function of the processor. For example, the following sections of code display power weights from the model 301A (FIG. 3A) for FPU 420 of RISC processor architecture 400.

```
File: floating.h (Header file)
struct floating : sc_module {
    int floating_weight_3;        //FADD
    int floating_power_3;
    int total_power;
    SC_CTOR(floating) {
        floating_weight_3 = 256;  //FADD
        floating_power_3 = 0;
        total_power = 0;
    }
    void power_report ( ) ;
    void entry ( ) ;
}
```

In the floating-point function performed by FPU 420, step "case 3" is floating-point addition. The power-weight value assigned to this step is 256. This value is calculated based on the number of embedded technology gates required to implement the floating-point add step in FPU 420. Each technology gate for performing floating point addition, embedded in FPU 420, is equivalent to a 2-input NAND function, with a power-weight of 4. This implies a power-weight of 1 for each device in (e.g., constituting) the NAND function. For every use of the floating-point step by model

301A (FIG. 3A), a power-weight of 256 is added to the total power dissipated by FPU 420, and correspondingly, by RISC processor 400. For example, the following sections of code display cumulative addition of power weights in model 301A (FIG. 3A) for FPU 420 of RISC processor 400.

```
File: floating.cpp (Model file)
#include "floating.h"
void floating::entry( ) {
    while (true) {
        switch (opcode_tmp){
            case 3:     // floating point addition
                opcode_encode = FADD;
                floating_power_3 += floating_weight_3;
                break;
        }
    }
}
void floating::power_report( ) {
    total_power =   floating_power_0 + floating_power_3 +
                    floating_power_4 + floating_power_5;
    printf(" Total FPU Power=%d\n",total_power);
}
```

In the present embodiment, power-weights for other execution functions of processor 400, such as those performed by ALU 410 and MMXU 430, are calculated and added in the same way as for FPU 420. For control functions, power-weights are calculated based on the number of technology gates, embedded in the component entity of processor 400 performing the function, needed to implement them.

In one embodiment, power-weights for memory functions of processor 400, such as those performed by I-cache 401 and D-Cache 402, and paging performed by TLB 403, are calculated using a more detailed approach. Referring to FIG. 4B, a memory functionality 4.0, considered to be a composite of functional sections including memory array 4.1, decoders and drivers in the memory 4.2, sense amplifiers and drivers of the memory 4.3, and intra-memory interconnects 4.4, may be treated by the present embodiment via its separate functional sections. The effects of these individual sections are considered separately while calculating the overall memory power-weights. It is appreciated that the power-weights methodology of the present embodiment may be extended to the power analysis of other parts of the processor.

In the present embodiment, estimation of maximum power consumption by processor 400 requires the operation of benchmark program 302 (FIG. 3A). Program 300 controls the operation of processor 400 in the architectural analysis model 301A (FIG. 3A). Advantageously, program 300 achieves this control by placing the processor in its maximum power mode, and operating it in that mode. Conventional applications (e.g., SPECint/fp, TPC-C, etc.) are unable achieve this control; they provide only an average value of power consumed for that particular application.

In one embodiment of the present invention, a benchmark for maximum power is generated by selecting a realistic mixture of instructions from a processor's instruction set architecture (ISA) that consume most power to execute. In the present embodiment, these selected instructions are combined in a realistic length of code to come up with the maximum power benchmark. In exemplary RISC processor 400, the instructions most consumptive of power in execution include the arithmetic operations of ALU 410 and FPU 420, operations of MMX 430, memory operations of caches 401 and 402, and branch operations. The mixes of the instruction groups are varied to tune for the maximum power mode of processor 400. Compiler 303 (FIG. 3A), which in one embodiment, is a Perl script, converts the benchmark code into executable binary for the SystemC simulations. It is appreciated that in one embodiment, compiler 303 may be another extraction and report language. In another embodiment, compiler 303 is another modality capable of string assembly. The following are sections of the tunable maximum power benchmark code of processor 400.

```
File: pattern_gen.c (Code file)
#define CODE_LENGTH 600
#define WITHOUT_FPU 1
#define WITHOUT_MMX 1
#define ALU_OP 5
#define FP_OP 60
#define MMX_OP 0
#define MEM_OP 30
#define BR_OP 5
void fadd_emu( ) { }
void fmul_emu( ) { }
void mmxadd_emu( ) { }
main( ) {
    int seed, actual_length;
    for (i=0; i< CODE_LENGTH; i++ {
        n=Rand(100);
        if (n <= ALU_OP)
            seed = Rand(19)−1;
        else if (n <= ALU_OP+FPU_OP)
            seed = 18 + Rand(4);
        ...
        switch (seed) {
        //ALU Operations
            case 0:
                alu_n++; break;
        //FPU Operations
            case 19:
                if (WITHOUT_FPU) { fadd_emu( );
                else { fp_n++;} break;
            }
        }
        actual_length = alu_n + fp_n + mmx_n + mem_n + branch_n;
}
```

Thus, these embodiments enable a modeling methodology, adding power-weights to the models, and benchmarking by a tunable maximum power program. Parameters of the technology selected to implement processor 400 may be linked to the power-weights. Advantageously, this enables calculating the maximum power consumed by processor 400.

EXEMPLARY PROCESSES

Determining Power Weights for Architectural Functions

Figure 4C:
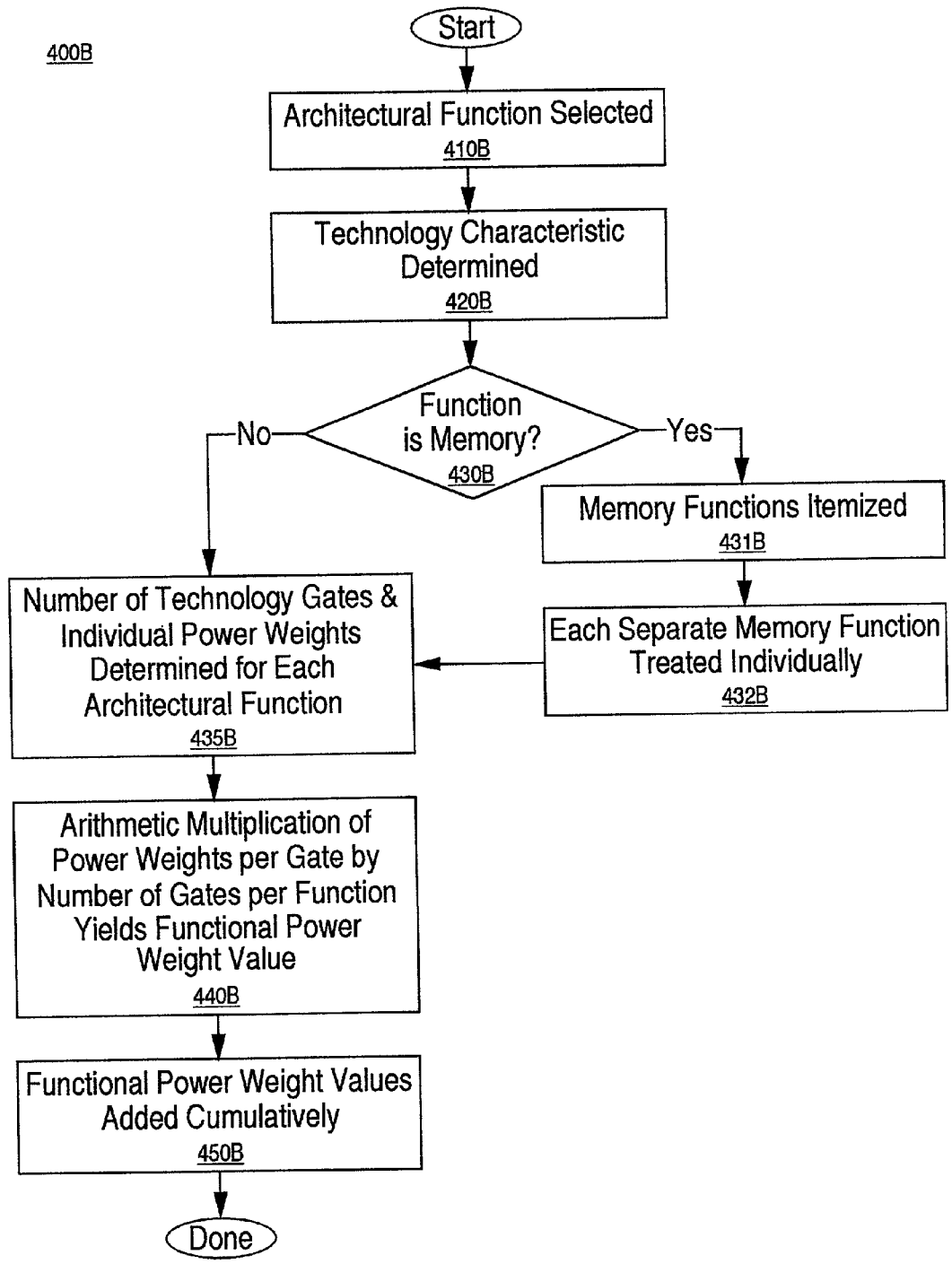
FIG. 4C is a flow chart of the steps in a process for calculation aggregation and accumulation of power weights, in accordance with one embodiment of the present invention.

Referring to FIG. 4C, the steps in a process 400B for determining the power weights of each architectural function of processor architecture 400 (FIG. 4A) is described, in accordance with one embodiment of the present invention.

Beginning at step 410B, an architectural function is selected. The technology characterizing the selected architectural function is determined; step 420B. For example, the characteristic technology may be a TSMC CMOS based structural medium of a certain transistor density and microscopic resolution (e.g., 0.18 microns).

In step 430B, it is determined whether the architectural function selected includes a memory function. If so, the memory functions are itemized; step 431B. For example, into component functional items such as memory array, decoders and drivers, sense amplifiers and drivers, and intra-memory interconnection (e.g., array 4.1, decoders/drivers 4.2, sense amplifiers/drivers 4.3, and intra-memory interconnects 4.4; FIG. 4B). Itemized memory structures, if present, are designated for individual treatment; step 432B.

Upon designation of itemized memory structures for individual treatment, or if no memory function was designated in step 430B, the number of technology gates and individual power weights is determined for each architectural function; step 435B. For example, to implement a floating point function, 32 two-input NAND functions may be required, each requiring a power weight of four (4).

The number of gates determined for each function is multiplied by the power weight per technology gate; step 440B. This generates a product giving a functional power weight value for that particular function.

In step 450B, the power weights are added cumulatively to generate a total power weight for the particular architectural function, completing process 400B.

CALCULATION OF MAXIMUM PROCESSOR POWER CONSUMPTION

Linkage of Selected Technologies to Power Weights

The reference switching element in power estimation, in accordance with the present embodiment, is a technology gate that is equivalent to a 2-input NAND function, with a power-weight of 4. For an exemplary TSMC 0.18 micron CMOS process technology, the energy expended by switching of 1 power-weight in the reference switching element can be calculated using the following energy equation, well known in the art:

$$(¼)[(½)CVdd^2] = 0.113 \text{ pico Joules}$$

where the first fraction is the reciprocal of the NAND gate power weight (4), C is the equivalent total gate capacitance, having a value of 0.4 pF (including all load and interconnect capacitances), and Vdd is the supply voltage for the NAND gate, having a value of 1.5 Volts.

Running the maximum power benchmark program 320A (FIG. 3A) on RISC processor 400 with an exemplary frequency of 1 GHz provides its total number of power-weights. Using the reference energy value above, in one embodiment, the maximum power consumed by the processor can be calculated in Watts.

Figure 5A:
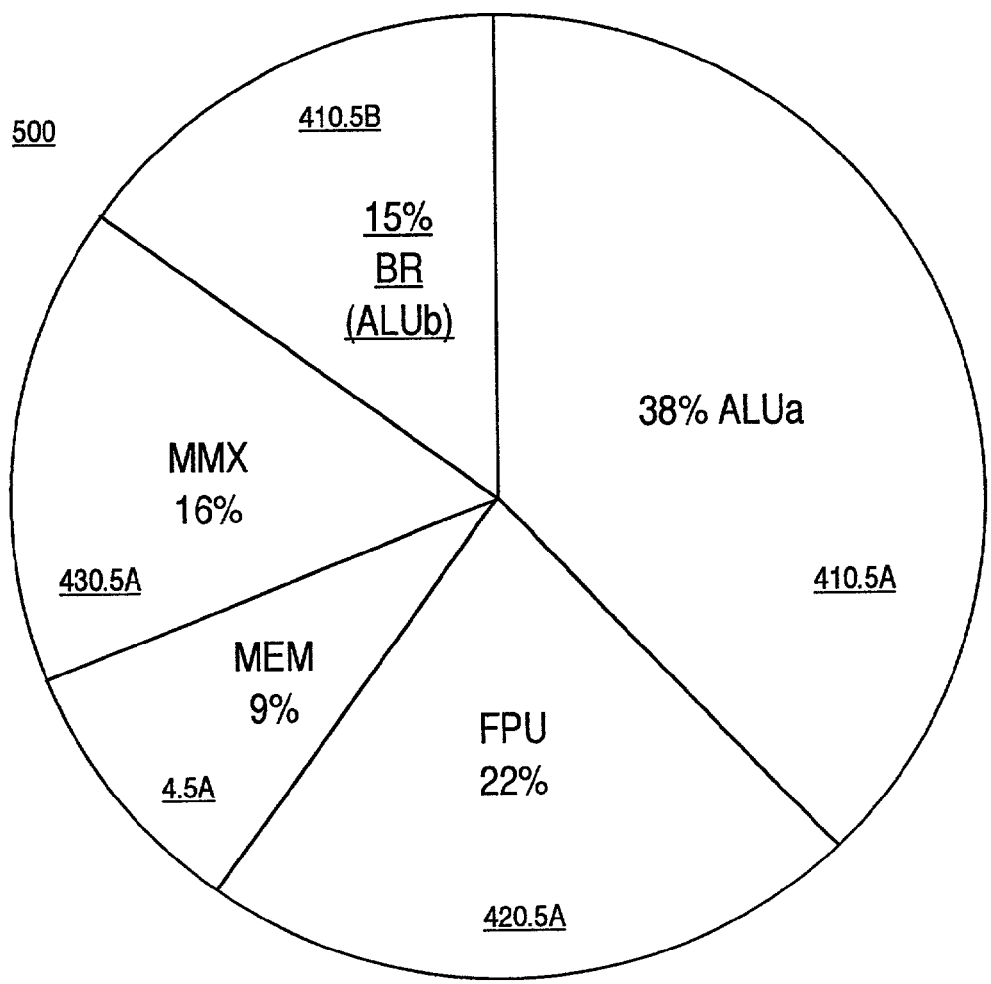
FIG. 5A is a graph depicting a reference ISA instruction profile in an exemplary maximum power benchmark program, in accordance with one embodiment of the present invention.

Referring to FIG. 5A, the instruction profile 500 of maximum power benchmark program 320A (FIG. 3A) used in the SystemC simulations is depicted graphically. Instruction profile 500 specifies the instructions to each of the individual functional units of RISC processor 400. ALU 420 (FIG. 4A) receives just over half the total program 320A instructions; 38% for execution of its arithmetic operations 410.5A and 15% for executing its branch execution operations 410.5B for a total of 53%. FPU 420 (FIG. 4A) receives 22% of the program 320A instructions for execution of its floating point operations 420.5A. Memory functions as performed by information and data caches 401 and 402, respectively (FIG. 4A), account for 9% of the program 320A instructions 4.5A. MMXU 430 (FIG. 4A) receives 16% of the program 320A instructions for executing its multi-media execution operations 430.5A.

Figure 5B:
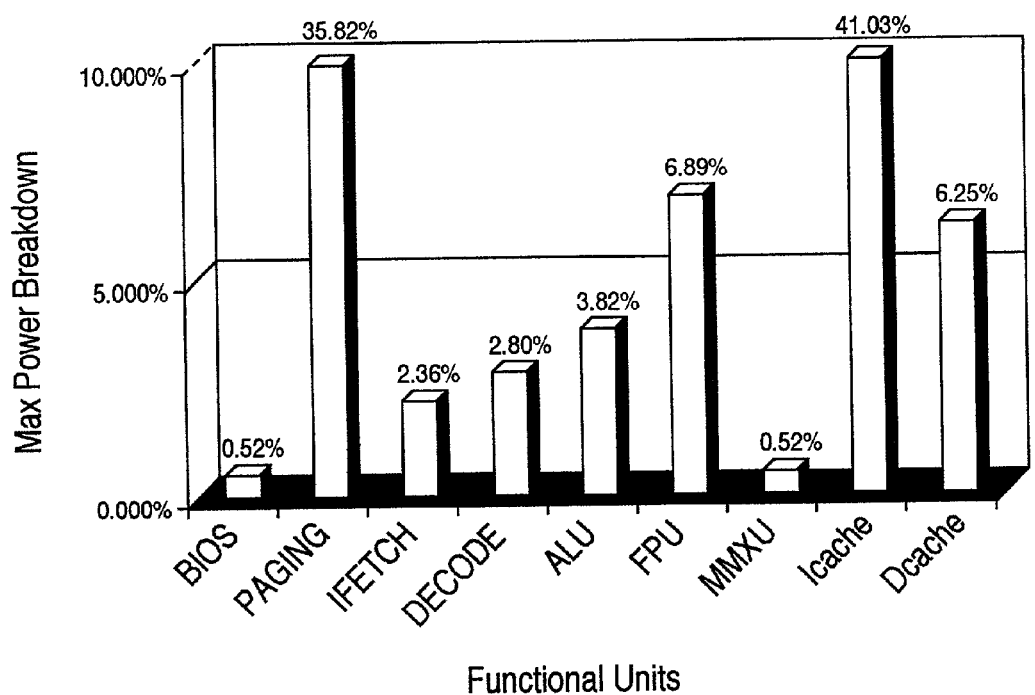
FIG. 5B is a graph depicting a reference breakdown of maximum power consumption by various exemplary architectural processor functions, in accordance with one embodiment of the present invention.

Running program 320A (FIG. 3A) in accordance with the present example results in power consumption by the corresponding functional units of processor 400 (FIG. 4A) as graphed in FIG. 5B. The usage of each functional unit is arrayed along the horizontal 5B1, with its percentage consumption measured along the vertical 5B2.

Advantageously, the present power estimation embodiment allows power based architectural tradeoffs to be modeled. Importantly, this allows architectural level design analysis of the power utilization of processors. In one embodiment, analytical emulation of processor functions is simulated, providing corresponding data. Such data are valuable in design for balancing power consumption against processor performance.

For example, simulations may be run, which selectively remove ISA instructions for architectural level functions, such as for FPU and/or MMXU, (e.g., FPU 420 and MMXU 430, respectively; FIG. 4A), and their emulation with ALU (e.g., ALU 410; FIG. 4A) instructions. In another example, simulations may be run, which selectively remove ISA instructions for memory functions, such as those provided by the information cache and/or the data cache (e.g., I-cache 401 and D-cache 402, respectively; FIG. 4A).

In these examples, the simulations run will yield corresponding power consumption data for the microprocessor, as well as data about its performance, such as any corresponding reduction in processing speed and/or accuracy. In this way, tangible architectural level information is generated allowing an analytical balancing of power consumption versus performance. Advantageously, this enables significant architectural level design improvement without the necessity of costly implementation level experimentation.

It is appreciated that such simulations, run in accordance with one embodiment of the present invention, are not limited to microprocessor architecture, but may be applied to other integrated circuit architectures, and extended to any system architecture, as well.

Exemplary Process

Figure 5C:
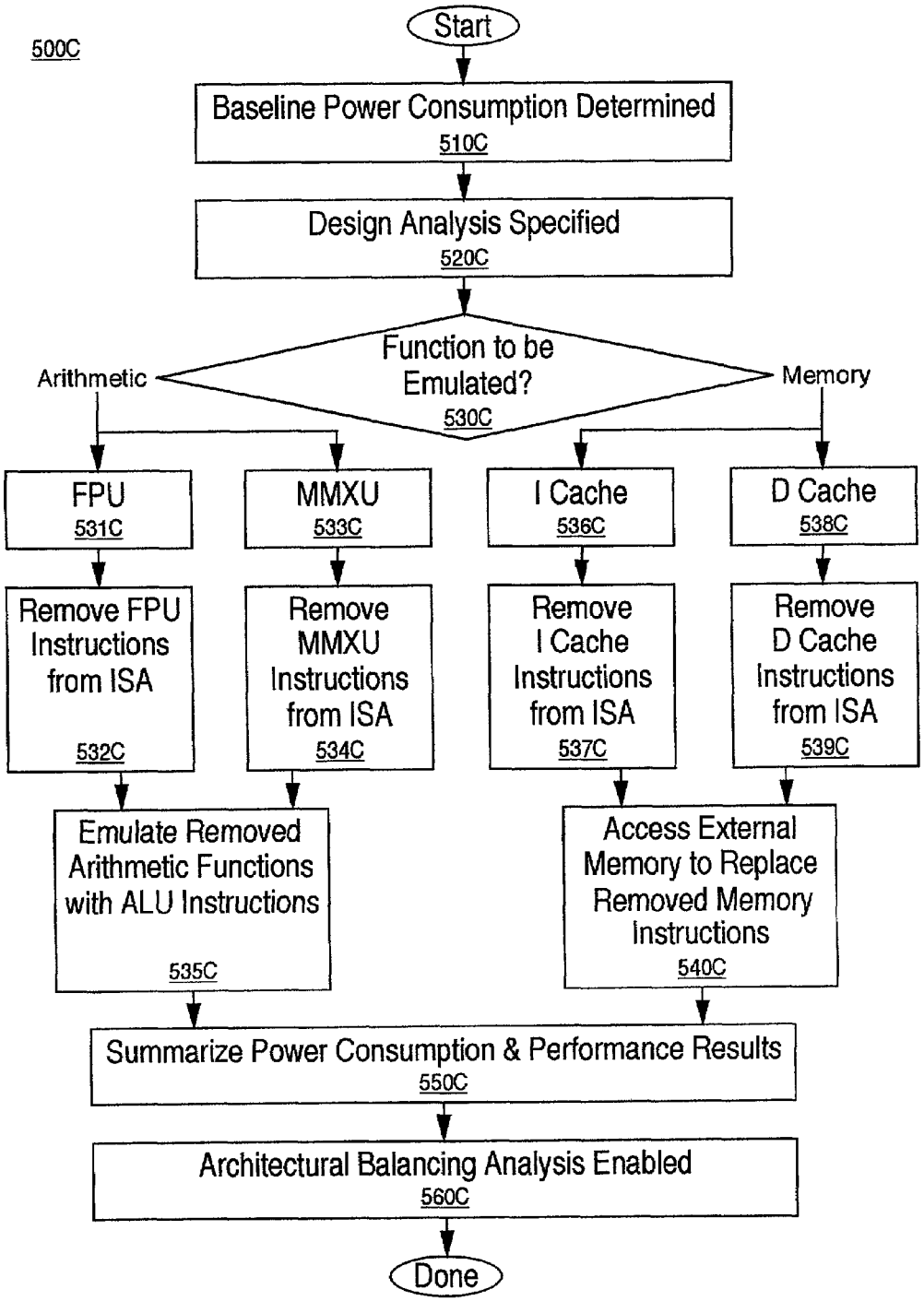
FIG. 5C is a flowchart of the steps in a process for enabling architectural function balancing analysis, in accordance with one embodiment of the present invention.

With reference to FIG. 5C, the steps in a process 500C enable the architectural level function emulation analysis. Beginning with step 510C, the baseline processor power consumption is determined. The design feature to be analyzed is specified in step 520C.

In step 530C, the type of architectural function to be emulated is decided upon. In the present example, either an arithmetic or a memory function may be selected.

Arithmetic functions may include those performed, in the present embodiment., by the FPU and/or the MMXU of the process architecture (e.g., FPU 420, MMXU 430, processor architecture 400, respectively; FIG. 4A). Mnemonic functions may include those performed, in the present embodiment., by the Instruction Cache and/or the Data Cache of the process architecture (e.g., I Cache 401, D Cache 402, processor architecture 400, respectively; FIG. 4).

The FPU functions are designated in step 531C. The MMXU functions are designated in step 533C. Instruction cache memory functions are designated in step 536C. Data cache instructions are designated in step 538C.

Upon designation of the FPU functions (step 531C), the FPU instructions are removed from the ISA; step 532C. Upon designation of the MMXU (step 533C), the MMXU instructions are removed from the ISA; step 534C.

Upon removal of the instructions for either arithmetic function from ISA, those removed function instructions are emulated by the functionally analogous ISA instructions to the ALU (e.g., ALU 410; FIG. 4).

Upon designation of the I cache functions (step 536C), the I cache instructions are removed from the ISA; step 537C. Upon designation of the D cache functions (step 538C), the D cache functions are removed from the ISA; step 539C.

Upon removal of the instructions for either mnemonic function from ISA, those removed function instructions must be satisfied by accessing an external memory resource; step 540C. In the case of the removal of I cache instructions (step 537C), the resulting absence of an I cache function in the processor architecture forces every instruction miss to be satisfied by an external memory access. In the case of the removal of D cache instructions (step 539C), the resulting absence of an D cache function in the processor architecture forces every data miss, either 'read' or 'write', to be satisfied by an external memory access.

Upon emulation of arithmetic functions (step 535C) or compensational external memory access (step 540C), the corresponding results on processor power consumption and processor performance may be summarized; step 550C.

Advantageously, this enables architectural balancing analysis, step 560C, whereupon process 500C may be complete.

Architectural balancing analysis allows comparison of power consumption versus performance tradeoffs at the architectural stage. For example, comparing the FPU and/or MMXU disabled processor power consumptions and performances to the processor benchmark power consumptions and performances may show a power consumption savings, but at the expense of degraded performance in terms of operating time delays. In another example, comparing the I cache and/or D cache disabled processor power consumptions and performances to the processor benchmark power consumptions and performances may show a power consumption savings offset by degraded performance in terms of operating time delays, due to the access time of external memory, which may be offset by advantages accrued from power availability to other processor functions.

Importantly, these design questions are addressed, in the present embodiment, at the architectural stage, in terms of real power and maximum power consumption. It is appreciated that the present embodiment may be applied to microprocessors, other processors and integrated circuits of any type, and to electronic systems.

In summary, the present invention provides a novel method for deriving a benchmark program for estimating the maximum power consumption in a microprocessor, other integrated circuit, or system. The present invention also provides a method deriving a benchmark program for estimating the power consumption in microprocessors, which is applied in initial architectural stages, during the design of microprocessors, before expenditure of resources is committed to the implementation of real devices. Further, the present invention provides a method for deriving a benchmark program for estimating the maximum power consumption in a microprocessor, which applies analysis based on maximum power dissipation by the processor. Further still, the present invention provides a method achieving the foregoing accomplishments, applicable to any microprocessor architecture under design, and permitting analysis of the design.

In one embodiment, for an electronic architecture with a functional constitution performing a number of functions characterized by separate stages performing subfunctions, a method of deriving a benchmark for estimating the maximum power consumption by modeling the model of the architecture, compiling the benchmark into a corresponding instruction stream, valuating power weights for each stage of each function of each constituent, inserting the power weights, running the model in a maximum power consumption mode, and summarizing power consumption. In one embodiment, the benchmark is applied by specifying a design analysis to be performed, selecting a function, designating a stages performing that function, removing a set of instruction set architecture instructions corresponding the designated stage, emulating the constituent subfunction corresponding to the stages designated stage, and summarizing.

In one embodiment, the model is written in SystemC. In one embodiment, a compiler used is a PERL script. In one embodiment, power weights are determined by selecting each architectural function individually, determining its characteristic technology, counting the number of its constituent technology gates, determining a power weight for each technology gates, deriving a power weight for each of said architectural functions selected. In one embodiment, a power virus program runs the model at maximum power mode. In one embodiment, both maximum power consumption results and architecture performance results are summarized. In one embodiment, the summary is analyzed.

An embodiment of the present invention, a method for deriving the benchmark program for estimating the maximum power consumption in a microprocessor, is thus described. While the present invention has been described in particular embodiments, it should be appreciated that the present invention should not be construed as limited by such embodiments, but rather construed according to the following claims.

What is claimed is:

1. For an electronic architecture with a functional constitution, said functional constitution performing a number of architectural functions characterized by separate stages, a method of deriving a benchmark program for maximum power consumption prior to an implementation of said architecture, said method comprising:
    modeling a functional model of said architecture;
    compiling said benchmark program into a corresponding instruction stream;
    valuating a power weight for each said stage of each said architectural function of each said functional constitution;
    running said model in a maximum power consumption mode; and
    summarizing said power consumption.

2. The method as recited in claim 1, wherein said functional model comprises a representation of said functional constitution of said architecture at a high level of abstraction capable of simulating the functioning of said architecture and said functional constitution thereof, the total power consumption of said architecture and of said functional constitution thereof, wherein said benchmark delineates power consumption of said architecture and said functional constitution thereof in terms of maximum power.

3. The method as recited in claim 2, wherein said modeling a functional model of said architecture further comprises writing a program in SystemC.

4. The method as recited in claim 1, wherein said compiling said benchmark program into a corresponding instruction stream is performed by a compiler.

5. The method as recited in claim 4, wherein said compiler is a PERL script.

6. The method as recited in claim 1, wherein said valuating a power weight for each-said stage of each said architectural function of each said functional constitution further comprises:
    selecting each of said architectural functions individually;
    determining the characteristic technology of each of said architectural functions selected;
    counting a number of technology gates constituting each of said architectural functions selected;
    determining a power weight for each of said technology gates; and
    deriving a power weight for each of said architectural functions selected.

7. The method as recited in claim 6, wherein said selecting each of said architectural functions individually further comprises:
   determining if said architectural functions selected are memory type functions;
   itemizing individual memory subfunctions; and
   treating each of said individual memory subfunctions as separate, equivalent, distinct architectural functions.

8. The method as recited in claim 6 wherein said deriving a power weight for each of said architectural functions selected comprises multiplying said power weight determined for each of said technology gates by said number of said technology gates.

9. The method as recited in claim 1, wherein said running said model in a maximum power consumption mode comprises running a power virus program.

10. The method as recited in claim 1, wherein said architecture is a microprocessor.

* * * * *

UNITED STATES PATENT AND TRADEMARK OFFICE
CERTIFICATE OF CORRECTION

PATENT NO. : 7,003,441 B2
APPLICATION NO. : 09/920382
DATED : February 21, 2006
INVENTOR(S) : Padmanabha Venkitakrishnan It is certified that error appears in the above-identified patent and that said Letters Patent is hereby corrected as shown below:

In column 6, line 45, after "embodiment," insert -- functions 303A, 304A, 305A, and 306A may be exercised by components of a --.

In column 14, line 56, in Claim 6, delete "each-said" and insert -- each said --, therefor.

Signed and Sealed this

Eighteenth Day of August, 2009

David J. Kappos
*Director of the United States Patent and Trademark Office*